United States Patent
Abe et al.

(10) Patent No.: US 11,084,601 B2
(45) Date of Patent: Aug. 10, 2021

(54) IN-FLIGHT DAMAGE DETECTION SYSTEM AND DAMAGE DETECTION METHOD

(71) Applicant: SUBARU CORPORATION, Tokyo (JP)

(72) Inventors: Masakatsu Abe, Tokyo (JP); Hideki Soejima, Tokyo (JP); Takeshi Fukurose, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 16/218,097

(22) Filed: Dec. 12, 2018

(65) Prior Publication Data
US 2019/0112072 A1    Apr. 18, 2019

Related U.S. Application Data

(63) Continuation of application No. PCT/JP2017/016838, filed on Apr. 27, 2017.

(30) Foreign Application Priority Data

Sep. 26, 2016    (JP) .............................. JP2016-186965

(51) Int. Cl.
   *B64D 45/00*    (2006.01)
   *G01B 17/04*    (2006.01)
   (Continued)

(52) U.S. Cl.
   CPC ............. *B64D 45/00* (2013.01); *G01B 17/04* (2013.01); *G01H 9/004* (2013.01);
   (Continued)

(58) Field of Classification Search
   CPC ............. G01M 5/0066; G01M 5/0016; G01M 5/0033; G01M 5/0091; G01N 29/4427;
   (Continued)

(56) References Cited

U.S. PATENT DOCUMENTS 4,524,620 A * 6/1985 Wright ................... G01N 29/14
                                                  416/61
5,814,729 A * 9/1998 Wu ....................... G01M 5/0033
                                                  356/32
(Continued)

FOREIGN PATENT DOCUMENTS

JP    2000-146746 A    5/2000
JP    2005-208000 A    8/2005
(Continued)

OTHER PUBLICATIONS

International Search Report issued in corresponding International Patent Application No. PCT/JP2017/016838, dated Jul. 18, 2017, with English Translation.
(Continued)

*Primary Examiner* — Tran M. Tran
(74) *Attorney, Agent, or Firm* — McDermott, Will & Emery LLP

(57) ABSTRACT

According to one implementation, a damage detection system includes: a physical quantity detection unit, a flight condition changing part and a damage detection part. The physical quantity detection unit detects a physical quantity of a structural object composing an aircraft during a flight of the aircraft. The flight condition changing part changes at least one flight condition of the aircraft to at least one specific flight condition when the physical quantity of the structural object has been detected by the physical quantity detection unit. The damage detection part determines whether a damage arose in the structural object, based on a physical quantity which has been detected, from the structural object of the aircraft flying with the at least one specific flight condition, by the physical quantity detection unit.

20 Claims, 6 Drawing Sheets

(51) Int. Cl.
*G01N 29/04* (2006.01)
*G01M 5/00* (2006.01)
*G01H 9/00* (2006.01)
*G01M 11/08* (2006.01)
*G01N 29/34* (2006.01)
*G01N 29/44* (2006.01)

(52) U.S. Cl.
CPC ........ *G01M 5/0033* (2013.01); *G01M 5/0041* (2013.01); *G01M 5/0066* (2013.01); *G01M 11/085* (2013.01); *G01N 29/045* (2013.01); *G01N 29/346* (2013.01); *G01N 29/348* (2013.01); *G01N 29/4436* (2013.01); *B64D 2045/0085* (2013.01); *G01N 2291/0258* (2013.01); *G01N 2291/2694* (2013.01)

(58) Field of Classification Search
CPC ............. G01N 29/4436; G01N 29/041; G01N 29/045; B64D 2045/0085; B64D 45/06; G01B 17/04
See application file for complete search history.

(56) References Cited

U.S. PATENT DOCUMENTS

| | | | | |
|---|---|---|---|---|
| 6,006,163 A * | 12/1999 | Lichtenwalner | ......... | G01H 5/00 702/34 |
| 6,672,162 B2 * | 1/2004 | Hirose | ................ | G01B 17/00 73/579 |
| 6,709,393 B2 * | 3/2004 | Ogawa | ................ | A61B 5/0097 356/479 |
| 6,826,982 B2 * | 12/2004 | O'Brien | ............. | G01M 5/0033 73/587 |
| 6,880,379 B2 * | 4/2005 | Hedberg | ................ | G01N 3/30 702/38 |
| 6,996,480 B2 * | 2/2006 | Giurgiutiu | ......... | G01M 5/0033 702/159 |
| 7,024,315 B2 * | 4/2006 | Giurgiutiu | ............ | G01N 29/11 702/33 |
| 7,263,446 B2 * | 8/2007 | Morin | ................ | G01N 29/11 702/33 |
| 7,469,595 B2 * | 12/2008 | Kessler | ................ | G01L 1/162 73/583 |
| 7,470,888 B2 * | 12/2008 | Ogisu | ............... | G01D 5/35303 250/227.14 |
| 7,571,058 B2 * | 8/2009 | Sealing | ............... | G01M 5/0033 702/34 |
| 7,654,148 B2 * | 2/2010 | Tomlinson, Jr. | ...... | G01N 29/07 73/801 |
| 7,660,690 B2 * | 2/2010 | Gordon | .................. | G01N 29/07 324/207.11 |
| 7,817,843 B2 * | 10/2010 | Senibi | .................. | G01N 29/041 382/141 |
| 7,930,112 B2 * | 4/2011 | Mattes | ................ | G01M 5/0016 702/36 |
| 8,060,319 B2 * | 11/2011 | Stothers | ............... | G01N 29/045 702/39 |
| 8,290,747 B2 * | 10/2012 | Hamel | .................... | F41A 19/01 702/187 |
| 8,355,830 B2 * | 1/2013 | Kordonowy | .......... | G07C 5/085 701/3 |
| 8,483,978 B2 * | 7/2013 | Tsubata | .................. | G01N 29/07 250/227.14 |
| 8,499,632 B1 * | 8/2013 | Ihn | .................. | G01N 29/348 73/587 |
| 8,583,381 B2 * | 11/2013 | Kajitani | .................... | G01S 5/30 702/39 |
| 8,594,882 B2 * | 11/2013 | Wilke | .................. | G07C 5/0816 701/29.1 |
| 8,766,511 B2 | 7/2014 | Duce et al. | | |
| 8,775,013 B1 * | 7/2014 | Smailus | ................. | B64F 5/60 244/190 |
| 8,880,242 B2 * | 11/2014 | Hinnant, Jr. | ........... | B64D 45/00 701/29.2 |
| 8,886,388 B2 * | 11/2014 | Moser | ................. | G01M 5/0033 701/29.1 |
| 8,954,208 B2 | 2/2015 | Yamasaki | | |
| 9,020,689 B2 * | 4/2015 | Smith | ................. | G05B 23/0254 701/29.1 |
| 9,146,095 B2 * | 9/2015 | Tsuda | ...................... | G01B 11/18 |
| 9,221,555 B2 * | 12/2015 | Hinnant, Jr. | ............ | B64D 45/00 |
| 9,327,842 B2 * | 5/2016 | Khial | .................... | G05D 1/0066 |
| 9,340,278 B2 * | 5/2016 | Hagerott | ................... | B64C 9/04 |
| 9,400,264 B2 * | 7/2016 | Yamamoto | ........... | G01N 29/069 |
| 9,470,659 B2 * | 10/2016 | Chaume | ................ | G01N 29/045 |
| 9,506,836 B2 * | 11/2016 | Pado | .................... | G01M 5/0033 |
| 9,701,402 B2 * | 7/2017 | Swanson | ............... | B64C 27/001 |
| 9,719,967 B2 * | 8/2017 | Kawiecki | .................. | G01L 1/16 |
| 9,733,217 B2 * | 8/2017 | Masson | ............... | G01N 29/069 |
| 9,851,331 B2 * | 12/2017 | Sasaki | ..................... | G01N 29/12 |
| 9,878,781 B2 * | 1/2018 | Swanson | ............... | B64C 27/001 |
| 10,001,776 B2 * | 6/2018 | Rangarajan | ........... | B64C 39/024 |
| 10,054,568 B2 * | 8/2018 | Soejima | ................. | G01N 29/07 |
| 10,081,443 B2 * | 9/2018 | Engel | .................... | B64D 45/00 |
| 10,126,274 B2 * | 11/2018 | Hall | ........................ | G01N 29/04 |
| 10,167,090 B2 * | 1/2019 | Brookhart | ............... | B64D 45/00 |
| 10,416,121 B2 * | 9/2019 | Takahashi | ................. | B32B 5/10 |
| 10,481,131 B2 * | 11/2019 | Takahashi | ............. | G01N 29/043 |
| 2004/0104302 A1 * | 6/2004 | Schierenbeck | ........ | B64D 27/00 244/10 |
| 2005/0163414 A1 | 7/2005 | Takeya et al. | | |
| 2006/0004499 A1 | 1/2006 | Trego et al. | | |
| 2009/0292409 A1 * | 11/2009 | Cordova | ................... | G07C 5/08 701/8 |
| 2009/0326834 A1 * | 12/2009 | Sundaresan | ......... | G01M 5/0041 702/34 |
| 2010/0161244 A1 | 6/2010 | Ghoshal et al. | | |
| 2011/0112775 A1 | 5/2011 | Bramban | | |
| 2011/0245999 A1 | 10/2011 | Kordonowy | | |
| 2012/0203474 A1 * | 8/2012 | Kawiecki | ............... | G01N 29/07 702/39 |
| 2013/0206916 A1 * | 8/2013 | Kordt | ........................ | B64C 9/34 244/203 |
| 2015/0032325 A1 * | 1/2015 | Hinnant, Jr. | ........... | B64D 45/00 701/29.2 |
| 2015/0081158 A1 * | 3/2015 | Stilkerich | .......... | G05B 23/0218 701/29.1 |
| 2015/0330950 A1 * | 11/2015 | Bechhoefer | ............ | G01N 29/46 73/587 |
| 2016/0144983 A1 * | 5/2016 | Thuong | ................. | G01M 17/00 701/31.7 |
| 2016/0274062 A1 * | 9/2016 | Takahashi | ................. | B23P 6/00 |
| 2016/0357191 A1 * | 12/2016 | Abdel-Motagaly | ......................... G05D 1/0066 |
| 2017/0052150 A1 * | 2/2017 | Zalameda | ............ | G01N 29/043 |
| 2017/0168021 A1 * | 6/2017 | Van Tooren | ......... | G01N 29/041 |
| 2017/0183107 A1 * | 6/2017 | Brookhart | .............. | G06Q 10/08 |
| 2018/0170532 A1 * | 6/2018 | Black | .................... | B64C 27/001 |
| 2018/0217014 A1 * | 8/2018 | Sun | ..................... | G01M 5/0033 |

FOREIGN PATENT DOCUMENTS

| | | |
|---|---|---|
| JP | 2008-536756 A | 9/2008 |
| JP | 2011-194974 A | 10/2011 |
| JP | 2013-051413 A | 3/2013 |
| WO | 2015/160945 A1 | 10/2015 |

OTHER PUBLICATIONS

Japanese Decision to Grant a Patent issued in corresponding Japanese Patent Application No. 2017-523545, dated Jun. 26, 2018, with English Translation.
Japanese Office Action issued in corresponding Japanese Patent Applicaiton No. 2017-523545, dated Apr. 17, 2018, with English Translation.
English Translation of the International Preliminary Report on Patentability in PCT/JP2017/16838, dated Apr. 4, 2019.

(56) References Cited

OTHER PUBLICATIONS

Chinese Office Action issued in corresponding Chinese Patent Application No. 201780047745.5, dated Feb. 3, 2020, with English translation.
Z. Haiyan et al., "Ultrasonic Lamb Wave Inspection Using Fiber Bragg Gratings", IEEE, 2008 China-Japan Joint Microwave Conference, Sep. 10, 2008, pp. 805-808.
Extended European Search Report issued in corresponding European Patent Application No. 17852608.3-1010, dated Apr. 23, 2020.
Third Chinese Office Action issued in corresponding Chinese Application No. 201780047745.5, dated Jun. 12, 2020, with English translation.

* cited by examiner

IN-FLIGHT DAMAGE DETECTION SYSTEM AND DAMAGE DETECTION METHOD

CROSS REFERENCES TO RELATED APPLICATIONS

This is a continuation of Application PCT/JP2017/16838, filed on Apr. 27, 2017.

This application is based upon and claims the benefit of priority from Japanese Patent Application No. 2016-186965 filed on Sep. 26, 2016; the entire contents of which are incorporated herein by reference.

FIELD

Implementations described herein relate generally to a damage detection system and a damage detection method.

BACKGROUND

When a body of an aircraft is damaged, it is important to detect the damage promptly. Therefore, various arts for detecting damage arising in a body of an aircraft are proposed (For example, refer to Japanese Patent Application Publication JP2011-194974 A and Japanese Patent Application Publication JP2008-536756 A). For example, technique for detecting damage by detecting an ultrasonic wave with a sensor disposed on a structural object composing an aircraft is proposed.

Although the conventional damage detection arts are suitable for an aircraft examination on the ground, they are difficult to detect damage with high accuracy during a flight. This is because strains arise in structural objects composing an aircraft due to factors including movements and vibrations of the aircraft body in addition to damage during a flight of the aircraft.

Accordingly, an object of the present invention is to make it possible to detect damage of an aircraft during a flight with higher accuracy.

SUMMARY OF THE INVENTION

In general, according to one implementation, a damage detection system includes: a physical quantity detection unit, a flight condition changing part and a damage detection part. The physical quantity detection unit detects a physical quantity of a structural object composing an aircraft during a flight of the aircraft. The flight condition changing part changes at least one flight condition of the aircraft to at least one specific flight condition when the physical quantity of the structural object has been detected by the physical quantity detection unit. The damage detection part determines whether a damage arose in the structural object, based on a physical quantity which has been detected, from the structural object of the aircraft flying with the at least one specific flight condition, by the physical quantity detection unit.

Further, according to one implementation, a damage detection method includes: detecting a physical quantity of a structural object composing an aircraft during a flight of the aircraft; changing at least one flight condition of the aircraft to at least one specific flight condition when the physical quantity of the structural object has been detected; and determining whether a damage arose in the structural object, based on a physical quantity detected from the structural object of the aircraft flying with the at least one specific flight condition.

DETAILED DESCRIPTION

A damage detection system and a damage detection method according to embodiments of the present invention will be described with reference to the accompanying drawings.
(First Implementation)
(Configuration and Function)

Figure 1:
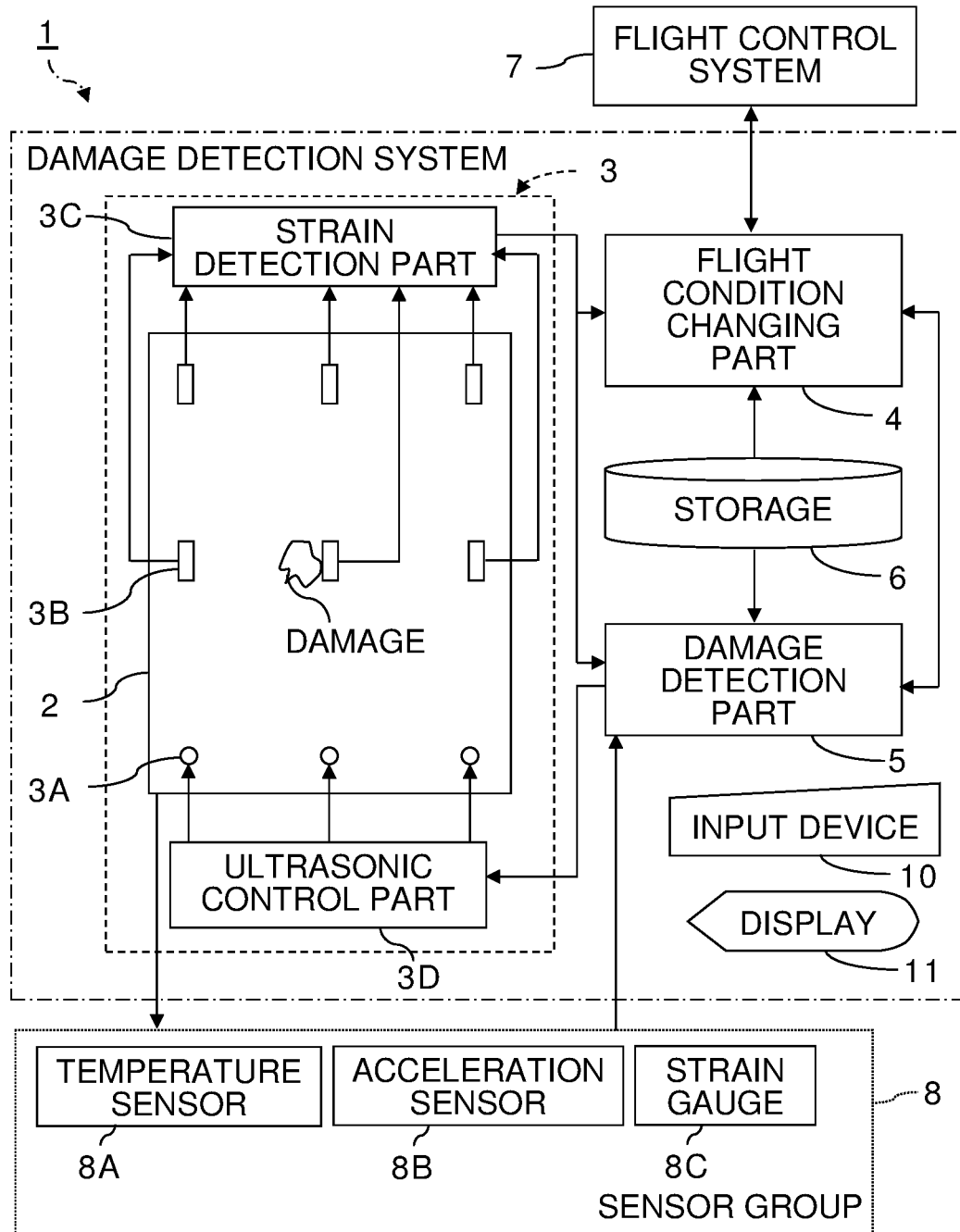
FIG. 1 is a configuration diagram of a damage detection system according to the first implementation of the present invention.

FIG. 1 is a configuration diagram of a damage detection system according to the first implementation of the present invention.

A damage detection system 1 determines whether a structural object 2 composing an aircraft is damaged or not during a flight. The damage detection system 1 has a physical quantity detection unit 3, a flight condition changing part 4, a damage detection part 5, and a storage 6.

The physical quantity detection unit 3 detects physical quantities of the structural object 2 composing an aircraft during flight of the aircraft. The physical quantities to be detected by the physical quantity detection unit 3 can be desired physical quantities which change when the structural object 2 has been damaged. Examples of typical and easily detectable physical quantities, which change when the structural object 2 has been damaged, include strain amounts, vibrations and accelerations of the structural object 2, Therefore, at least one of strain amounts, vibrations and accelerations of the structural object 2 may be detected by the physical quantity detection unit 3.

Since a vibration is a tune change in a minute strain amount, a vibration can also be detected as a time change in a minute strain amount. That is, a vibration is detectable also by detecting a time change of a strain amount with an appropriate time resolution.

Although an example case where the physical quantity detection unit 3 detects strain amounts of the structural object 2 will be mainly described hereinafter, it is similar when physical quantities, such as accelerations, other than strain amounts are detected.

The flight condition changing part 4 has a function to change at least one flight condition of an aircraft, including at least one of a load factor, an airspeed, and an angular velocity of the aircraft, into a specific flight condition when a physical quantity of the structural object 2 has been detected by the physical quantity detection unit 3. The damage detection part 5 has a function to determine whether the structural object 2 has been damaged or not, based on physical quantities detected by the physical quantity detection unit 3 from the structural object 2 of the aircraft flying under the changed flight condition. Note that, a main cause of damage in the structural object such as a wing of an aircraft, is collision of a bird or a hail.

The storage 6 stores physical quantities, such as strain amounts, of the structural object 2 of an aircraft corresponding to at least one specific flight condition of the aircraft and the state where the structural object 2 is not damaged, with relating the physical quantities to the corresponding specific flight condition. Specifically, the storage 6 stores at least one flight condition of an aircraft related with physical quantities generated in the structural object 2 of the aircraft flying under the at least one flight condition with no damage. Practically, flight conditions related to sets of physical quantities respectively are stored in the storage 6. Therefore, the storage 6 functions as a database which shows a relation between flight conditions and sets of physical quantities, such as strain amounts of the structural object 2.

When strain amounts of the structural object 2 are detected by the physical quantity detection unit 3, the physical quantity detection unit 3 can be composed of ultrasonic oscillators 3A, vibratory sensors 3B, a strain detection part 3C, and an ultrasonic control part 3D as exemplified in FIG. 1. Note that, also in the case of detecting vibrations of the structural object 2, the vibrations can be detected with the configuration exemplified in FIG. 1 since each vibration can be detected as a change in strain amount with a high frequency as mentioned above. When accelerations of the structural object 2 are detected, the physical quantity detection unit 3 can be composed of acceleration sensors which detect the accelerations of the structural object 2 respectively, instead of the vibratory sensors 3B.

Each of the ultrasonic oscillators 3A is an element, such as an actuator, which oscillates an ultrasonic wave towards the structural object 2 to propagate the ultrasonic wave in the structural object 2. Each of the vibratory sensors 3B is a sensor for receiving an ultrasonic wave which propagates in the structural object 2. Each vibratory sensor 3B can be composed of an optical fiber sensor, such as a FBG (fiber Bragg grating) sensor or a PS-FBG (phase-shifted FBG) sensor, which detects a vibration, such as an ultrasonic vibration, as a change in strain amount with a high frequency, besides an ultrasonic transducer as an acoustic sensor. When the vibratory sensor 3B is composed of an optical fiber sensor, necessary optical elements, such as a light source and a light filter, are installed.

The strain detection part 3C has a function to detect strain amounts of the structural object 2 based on changes of ultrasonic waveforms, received by the vibratory sensors 3B respectively, from a reference waveform or reference waveforms. More specifically, a waveform of ultrasonic wave which has propagated in the structural object 2 without strains can be previously obtained as a reference waveform. Further, a relation between a strain amount and a change amount in waveform of an ultrasonic wave, which has propagated in the structural object 2 with strains, from the reference waveform can be previously obtained by examination or the like. Thus, amounts of strains which arose in the structural object 2 can be detected by observing waveforms of ultrasonic waves which propagated in the structural object 2.

An object to be calculated as a change amount in an ultrasonic waveform may be an index, such as an amplitude of the ultrasonic waveform, an integral value (area) of the ultrasonic waveform in the time direction, the maximum value of the ultrasonic waveform, or an average value of the ultrasonic waveform. In order to reduce noise superimposed on an output signal from each of the vibratory sensors 3B, necessary signal processing, such as averaging and filter processing, may be applied. When averaging is applied, oscillation and detection of an ultrasonic wave are repeated multiple times.

An area of the structural object 2 in which strain amounts can be detected by the strain detection part 3C is an area which can propagate an ultrasonic wave and in which the propagated ultrasonic wave can be received with a sufficient intensity by each vibratory sensor 3B. Therefore, disposing a plurality of the ultrasonic oscillators 3A and a plurality of the vibratory sensors 3B at appropriate intervals as exemplified in FIG. 1 makes it possible to cover a wide area of the structural object 2.

Note that, a system which diagnoses soundness of structure by a sensor built in an aircraft is referred to as Structural Health Monitoring (SHM) system.

The ultrasonic control part 3D controls drive of the ultrasonic oscillators 3A. A function to change at least one of an amplitude and a frequency of an ultrasonic wave which is oscillated from each ultrasonic oscillator 3A can be provided for the ultrasonic control part 3D. When an amplitude and a frequency of an ultrasonic wave which is oscillated from each ultrasonic oscillator 3A can be changed, it becomes possible to oscillate the ultrasonic wave under conditions suitable for damage detection of the structural object 2. For example, when an amplitude or a frequency of an ultrasonic wave is increased, it becomes easy to detect the ultrasonic wave by each vibratory sensor 3B.

When each vibratory sensor 3B disposed on the structural object 2 is composed of a strain sensor, such as an optical fiber sensor, which can detect a static strain, strains arising due to damage in the structural object 2 can be detected. In that case, the strain detection part 3C can detect strain amounts of the structural object 2 based on output signals from strain sensors, such as optical fiber sensors. Therefore, strain amounts may be detected by the vibratory sensors 3B, which can also be used as strain sensors, with turning operations of the ultrasonic oscillators 3A off.

When strain amounts of the structural object 2 are detected in the strain detection part 3C, it becomes possible to determine whether the structural object 2 has been damaged, based on the strain amounts. During flight of the aircraft, strains also arise due to vibrations and deformations of the structural object 2. Therefore, it is necessary to distinguish whether strains of the structural object 2 are due to damage or due to vibrations and deformations of the structural object 2. In other words, strains caused by vibrations and deformations of the structural object 2 acts as a flight disturbance like a noise in a strain detection for detecting damage. Therefore, it is necessary to detect strains caused by damage, while strains caused by a flight disturbance exist, in order to detect damage of the structural object 2 during flight of the aircraft.

When damage having arisen in the structural object 2 is small, strain amounts due to the damage becomes relatively smaller than strain amounts due to flight disturbances, such as vibrations and deformations of the structural object 2. In such a case, changes in strain amounts between before and after the damage generation become small, thereby detection of the damage becomes difficult. That is, there is a risk of omission of a damage detection and an incorrect damage detection. When damage is detected incorrectly, unnecessary flight restrictions, such as lowering an altitude and reducing speed, are imposed. Conversely, when small damage is left as it is and a flight is kept without flight restrictions, the damage may enlarge and threaten safety.

For that reason, the damage detection system 1 has the flight condition changing part 4 which changes at least one flight condition of the aircraft into a specific flight condition suitable for detection of damage when strains of the structural object 2 have been detected by the physical quantity detection unit 3. The flight condition changing part 4 is configured to obtain a detection result of strain amounts of the structural object 2 from the strain detection part 3C of the physical quantity detection unit 3 and automatically change at least one flight condition of the aircraft to a specific flight condition suitable for detection of damage by controlling the flight control system 7 of the aircraft when the strain amounts are not large enough to detect the damage.

Meanwhile, the damage detection part 5 is configured to obtain a detection result of strain amounts of the structural object 2, from the strain detection part 3C of the physical quantity detection unit 3 and detect damage based on the strain amounts of the structural object 2 when the strain amounts are large enough to detect the damage. In addition, the damage detection part 5 is configured to determine whether damage has been arisen in the structural object 2, based on strain amounts detected, by the physical quantity detection unit 3, from the structural object 2 of the aircraft which flies under the changed flight condition suitable for detection of the damage.

Examples of flight condition suitable for detection of damage include a flight condition under which a body is intentionally made unstable, besides a stable flight condition under which flight disturbances, such as vibrations and deformations of the structural object 2, are made smaller. Examples of flight condition under which a body is intentionally made unstable include a flight condition under which damage in the structural object 2 is expanded and a flight condition under which strain amounts caused by damage in the structural object 2 increase.

When a flight condition of the aircraft is changed to one under which damage in the structural object 2 is expanded, the damage is expanded. That is, small damage can be expanded by flying the aircraft under flight conditions for intentionally swinging the body in an extent with no danger. Therefore, amounts of strains caused by the damage also become large enough to detect the damage, and it becomes possible to detect the damage with satisfactory accuracy in the damage detection part 5, based on the strain amounts of the structural object 2 detected in the physical quantity detection unit 3. That is, it becomes possible to determine whether damage has been arisen in the structural object 2, based on a detection result of the strain amounts caused by the expanded damage.

When a flight condition of the aircraft is changed to a flight condition under which strain amounts caused by damage in the structural object 2 increase, the strain amounts caused by the damage can be increased to a degree to allow detecting the damage. Specifically, even when changes in strain amounts caused by damage are too small to be detected in the strain detection part 3C, the changes in the strain amounts caused by the damage can be increased by a flight by which load in an extent with no danger is intentionally applied on the body. Therefore, the damage detection part 5 becomes possible to determine whether damage has been arisen in the structural object 2 based on a detection result of the increased strain amounts.

Meanwhile, when a flight condition of the aircraft is changed to a specific flight condition which is determined to reduce strain amounts of the structural object 2 caused by flight of the aircraft, strain amounts caused by damage can be enlarged relatively to the strain amounts caused by the flight disturbances. That is, when detection of the strain amounts caused by the damage is difficult due to the flight disturbances, the influence by the flight disturbances can be suppressed by a stable flight so that the changes in the strain amounts caused by the damage can be detected.

Alternatively, a flight condition of the aircraft can be changed to a specific flight condition where strain amounts of the structural object 2 caused by flight of the aircraft are known. In this case, strain amounts caused by damage can be detected as variation amounts from the strain amounts of the structural object 2 caused by flight of the aircraft. Therefore, it is not always necessary to change a flight condition so that strain amounts of the structural object 2 caused by flight of the aircraft are reduced.

These specific flight conditions suitable for detection of damage can be determined by examinations, simulations or the like previously and stored in the storage 6. Then, the flight condition changing part 4 is configured to select and read one specific flight condition stored in the storage 6, and to change the present flight condition of the aircraft to the selected one specific flight condition.

When damage is detected by changing a flight condition of the aircraft to a flight condition to make the body unstable intentionally, or conversely when a flight condition of the aircraft is changed to a specific flight condition determined so that strain amounts of the structural object 2 caused by flight of the aircraft are reduced, the flight condition to be changed can be stored in the storage 6. Thus, a flight condition of the aircraft can be changed to the specific flight condition stored in the storage 6 when a strain of the structural object 2 which may be caused by damage has been detected by the physical quantity detection unit 3.

A plurality of flight conditions of the aircraft may also be stored in the storage 6. In that case, when a strain of the structural object 2 which may have been caused by damage is detected by the physical quantity detection unit 3, a flight condition can be changed to the initial flight condition suitable for damage detection stored in the storage 6. Subsequently, if the damage detection part 5 cannot still determine whether damage has arisen in the structural object 2 even though the aircraft flies under the changed initial flight condition, the changed initial flight condition of the aircraft can be changed to another specific flight condition.

Even when a flight condition of the aircraft is the same, a strain having an enough size to detect damage may be detected by the physical quantity detection unit 3 when at the least one of an amplitude and a frequency of an ultrasonic wave which is oscillated from the ultrasonic oscillator 3A is changed. Thus, when whether damage has arisen in the structural object 2 cannot still be determined even though a flight condition is changed to a specific flight condition suitable for damage detection stored in the storage 6, at least one of an amplitude and a frequency of an ultrasonic wave which is oscillated from each ultrasonic oscillator 3A may be changed by control of the ultrasonic control part 3D, during flight of the aircraft under the changed specific flight condition.

Then, the damage detection part 5 can determine whether damage has arisen in the structural object 2 based on strain amounts detected based on changes from a reference waveform, of respective waveforms of ultrasonic waves which have been oscillated from each ultrasonic oscillator 3A with changing at least one of amplitude and frequency and have propagated in the structural object 2.

Note that, parameters consisting of a flight condition of the aircraft, an amplitude of ultrasonic wave and a frequency of ultrasonic wave may be changed subsequently until a large strain whose amount is enough to detect damage is detected. In that case, the parameters may be changed in a desired order. Specifically, when strain amounts of the structural object 2 do not become large enough to detect damage even though a flight condition of the aircraft is changed, a condition for ultrasonic oscillation, such as an amplitude, a frequency or the like of an ultrasonic wave, may be changed. Conversely, when strain amounts of the structural object 2 do not become large enough to detect damage even though a condition for ultrasonic oscillation is changed, a flight condition of the aircraft may be changed.

On the other hand, when damage is detected by changing a flight condition of the aircraft to a specific flight condition where strain amounts in the structural object 2 caused by flight of the aircraft are known, at least one combination consisting of a specific flight condition and strain amounts generated in the structural object 2 in the case that the aircraft flies under the specific flight condition is stored in the storage 6. In this case, a table or a function relating flight conditions to sets of strain amounts in the structural object 2 corresponding to the flight conditions may also be stored in the storage 6.

When a specific flight condition and strain amounts of the structural object 2 which are related to each other are stored in the storage 6, the damage detection part 5 can determine whether damage has arisen in the structural object 2 based on strain amounts detected by the physical quantity detection unit 3 from the structural object 2 of the aircraft flying under the changed specific flight condition and the strain amounts, corresponding to the state where damage does not exist in the structural object 2, related with the changed specific flight condition and stored in the storage 6.

Specifically, the strain amounts of the structural object 2 caused by flight disturbances can be cancelled by subtracting the strain amounts, corresponding to the state where damage does not exist in the structural object 2, from actual measured values of strain amounts detected by the physical quantity detection unit 3 from the structural object 2 of the aircraft which flies under the specific flight condition. As a result, the strain amounts of the structural object caused by damage can be detected. In other words, the damage detection part 5 can perform correction which cancels the strain amounts of the structural object 2 caused by the flight disturbances, from the actual measured values of the strain amounts detected by the physical quantity detection unit 3 from the structural object 2 of the aircraft which flies under the specific flight condition, using correction data consisting of the strain amounts corresponding to the state where damage does not exist in the structural object 2. Then, the damage detection part 5 can determine whether damage has arisen in the structural object, based on the corrected strain amounts of the structural object 2, with high accuracy.

Note that, even when a flight condition of the aircraft is the same, great variations in temperature and magnitude of vibration of the structural object 2 cause changes in strain amounts of the structural object 2, which are not negligible, depending on the temperature and the magnitude of vibration of the structural object 2. In particular, rigidity of the structural object 2 changes when the temperature of the structural object 2 changes. Therefore, the strain amounts of the structural object 2 caused by the flight disturbances change when the temperature of the structural object 2 changes. Accordingly, a set of strain amounts of the structural object 2 can be stored for every parameter, such as temperature, instead of storing one set of strain amounts of the structural object 2 for one flight condition. That is, strain amounts of the structural object 2 related with a combination consisting of a flight condition suitable for damage detection and a single parameter or a plurality of parameters, such as the temperature and the vibration of the structural object 2, can be stored in the storage 6.

The typical aircraft has sensor group 8 for detecting temperatures and vibrations of the structural object 2. Typical sensors which compose the sensor group 8 include temperature sensors 8A, acceleration sensors 8B and strain gauges 8C. When the temperature sensor 8A is used, a temperature of the structural object 2 can be measured. Meanwhile, using the acceleration sensor 8B makes it possible to detect a vibration as a time change of acceleration of the structural object 2. In addition, using the strain gauge 8C makes it possible to detect a static strain amount of the structural object 2 and a change in strain amount with a low frequency.

Accordingly, the damage detection part 5 can determine whether damage has arisen in the structural object 2, based on at least one of the temperature of the structural object 2 obtained from the temperature sensor 8A installed in the structural object 2 of the aircraft, an acceleration of the structural object 2 obtained from the acceleration sensor 8B installed in the structural object 2 of the aircraft and a strain amount of the structural object 2 obtained from the strain gauge 8C installed in the structural object 2 of the aircraft.

For a concrete example, strain amounts of the structural object 2 related to a combination of a specific flight condition suitable for damage detection and at least one parameter, such as a vibration observed as an acceleration change and a temperature of the structural object 2, can be obtained from the storage 6, and the obtained strain amounts can be subtracted from actual measured values of strain amounts detected by the physical quantity detection unit 3 from the structural object 2 of the aircraft which flies under the specific flight condition. Thereby, sizes of the strains generated in the structural object 2 caused by the damage can be calculated. Then, whether damage has s in the structural object 2 can be determined with high accuracy, based on the sizes of the strains generated in the structural object 2 caused by the damage.

When accelerations of the structural object 2 are detected by the physical quantity detection unit 3, an actual measured value of acceleration of the structural object 2 detected by the acceleration sensor 8B can be subtracted from each of actual measured values of accelerations of the structural object 2 detected by the physical quantity detection unit 3. Thereby, accelerations generated in the structural object 2 caused by damage can be obtained. Accordingly, whether damage has arisen in the structural object 2 can be determined with high accuracy, based on the accelerations generated in the structural object 2 caused by the damage.

Alternatively, as another example, sizes of strains generated in the structural object 2 caused by damage can also be calculated by subtracting actual measured values of strain amounts of the structural object 2 obtained from the strain gauges 8C, from actual measured values of strain amounts of the structural object 2 detected by the physical quantity detection unit 3.

The damage detection part 5 may detect a size of damage, an area where damage arose, a position where damage arose, or the like as well as whether damage arose. These detections can be performed in desired methods. For example, existence of damage can be determined based on whether a strain due to the damage was detected with a certain strain amount, as mentioned above. Specifically, when it is determined that a stain whose amount is more than a threshold value determined empirically or a strain whose amount is not less than a threshold value determined empirically is caused by damage, it can be determined that damage has been arisen in the structural object 2.

When a relationship between sizes of damage and strain amounts of the structural object 2 is previously obtained by examination or the like, a size of damage can be estimated by measuring a size of strain caused by the damage. When a plurality of the vibratory sensors 3B are disposed on the structural object 2 and each vibratory sensor 3B by which a strain caused by damage was detected is specified, an area where the damage arose can be specified. Further, when a distribution of strain amounts detected by the vibratory sensors 3B is analyzed, a position where the damage arose can be estimated. Alternatively, a position or an area where damage arose can be also specified by detecting the damage in detail, with switching the ultrasonic oscillator 3A which oscillates an ultrasonic wave.

When existence of damage, a size of damage, an area or a position of damage, and the like have been detected, they can be recorded as a result of damage detection. Further, flight conditions, such as an altitude and a speed, of the aircraft can be restricted based on the result of the damage detection. When the aircraft is an unmanned aircraft, a mission of the unmanned aircraft can also be changed based on the result of the damage detection. In that case, restriction of flight conditions and updating a mission can be performed automatically by outputting control signals to necessary systems, such as the flight control system 7, from the damage detection part 5.

Note that, examples of mission for an unmanned aircraft include a flight path for observation, photographing, pesticide spraying or the like, a target point, a target or the like. Even in the case of a manned aircraft, a mission, such as a destination, may be changed based on the result of the damage detection.

Each element, which processes an electric signal, out of elements composing the above mentioned damage detection system 1 can be composed of electric circuitry. Each element which processes digital information can be composed of electronic circuit consisting of a computer reading program. When an optical fiber sensor is used as the vibratory sensor 3B, an optical signal is output from the vibratory sensor 3B. Therefore, optical elements for processing an optical signal and a photoelectric conversion circuit can be included for composing the physical quantity detection unit 3. When an electric signal converted from an optical signal by the photoelectric conversion circuit is converted into a digital signal to perform signal processing, an A/D (analog-to-digital) converter is also used as an element Besides elements described above, the damage detection system 1 can have an input device 10 and a display 11 as a user interface for setting detection conditions of damage and a user interface for outputting a result of damage detection respectively, as needed.

When the aircraft is a manned aircraft, a pilot can set detection conditions of damage, such as timing of damage detection, an interval of damage detection, whether an ultrasonic wave is oscillated from each ultrasonic oscillator 3A for damage detection and timing of oscillating an ultrasonic wave, by operation of the input device 10 during flight of the aircraft, for example. Meanwhile, when the aircraft is an unmanned aircraft, detection conditions of damage as described above can be also set by operation of the input device 10 by a user of the aircraft before flight of the aircraft.

When the aircraft is a manned aircraft, a detection result of damage can be displayed on the display 11. Meanwhile, when the aircraft is an unmanned aircraft, a detection result of damage can be also displayed on the display 11 so that a user of the aircraft can check the detection result of the damage after flight of the aircraft.

(Operation and Action)

Next, a damage detection method of an aircraft structural object by the damage detection system 1 will be described.

Firstly, a flow will be described in a case where the vibratory sensors 3B of the physical quantity detection unit 3 are composed of strain sensors, such as optical fiber sensors, and damage in the structural object 2 is detected with turning off operations of the ultrasonic oscillators 3A. Hereinafter, a mode in which strain amounts generated in the structural object 2 are measured by the strain sensors, without oscillating ultrasonic waves from the ultrasonic oscillators 3A, and the damage detection part 5 detects existence of damage based on the measured strain amounts is referred to as a passive damage detection mode.

Meanwhile, a mode in which ultrasonic waves are oscillated by turning on operations of the ultrasonic oscillators 3A, vibrations of the ultrasonic waves which have propagated in the structural object 2 are detected by the vibratory sensors 3B to calculate strain amounts of the structural object 2, and the damage detection part 5 detects existence of damage based on the calculated strain amounts of the structural object 2 is referred to as an active damage detection mode.

One of the passive damage detection mode and the active damage detection mode can be selected by a user of the aircraft, in the case where the aircraft is an unmanned aircraft, or by a pilot, a mechanic, or the like of the aircraft, in the case where the aircraft is a manned aircraft. Alternatively, the passive damage detection mode and the active damage detection mode can also be used together. For a concrete example, when it is determined in the passive damage detection mode that damage may have arisen, the damage can be detected in the active damage detection mode.

Henceforth, a mode in which the aircraft flies under a specific flight condition suitable for detection of damage is referred to as a damage detection flight mode.

Figure 2:
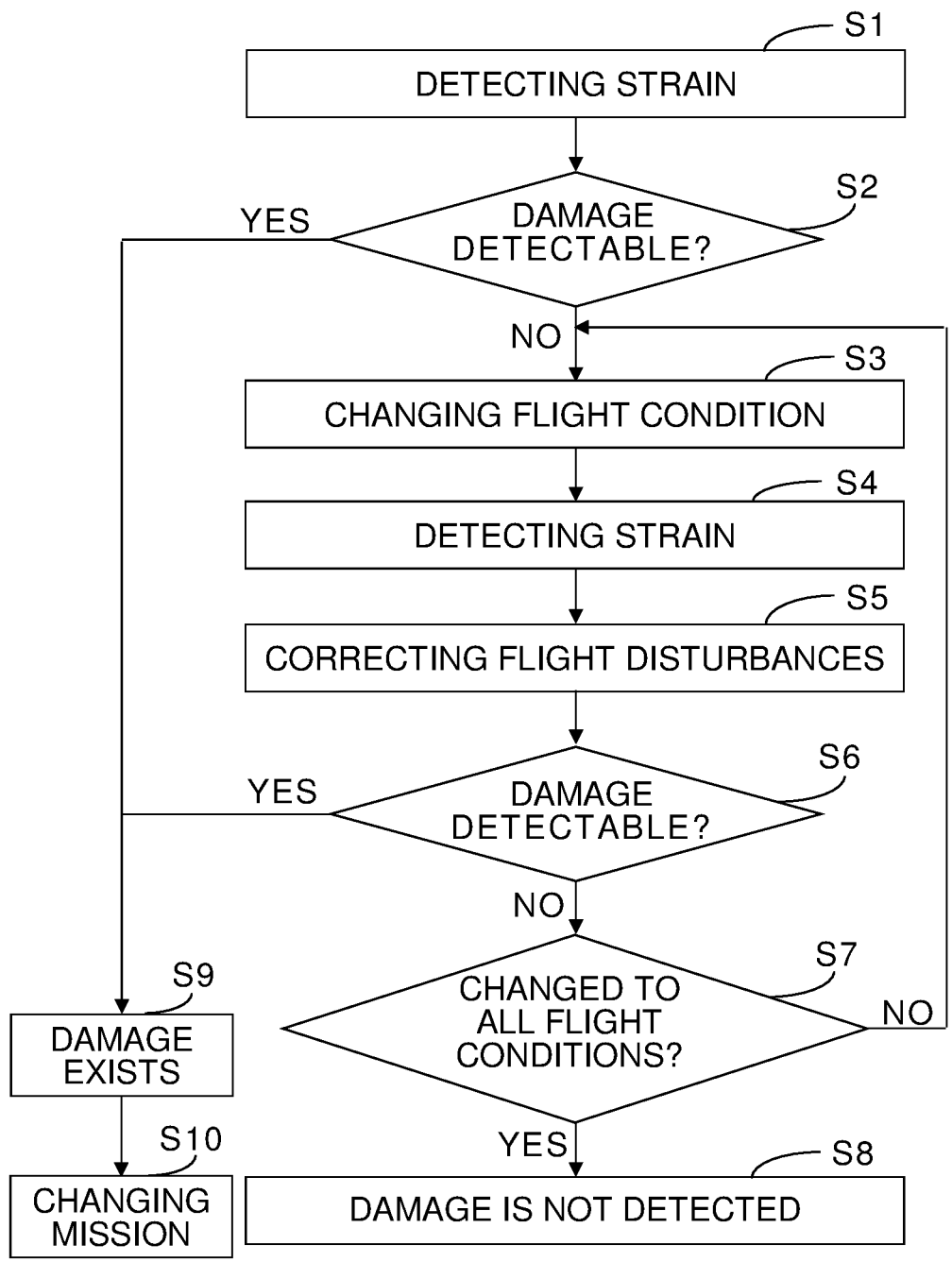
FIG. 2 is a flow chart which shows an example of flow for determining whether damage has arisen in the structural object of an aircraft during flight, in the passive damage detection mode, by the damage detection system shown in FIG. 1.

FIG. 2 is a flow chart which shows an example of flow for determining whether damage has arisen in the structural object 2 of an aircraft during flight, in the passive damage detection mode, by the damage detection system 1 shown in FIG. 1.

Firstly, the passive damage detection mode alone or a damage detection mode which switches to the active damage detection mode to perform damage detection when a suspicion of damage has been detected in the passive damage detection mode is designated by operation of the input device 10 before flight of the aircraft. Alternatively, when the aircraft is a manned aircraft, a pilot may designate the passive damage detection mode alone or the damage detection mode which performs damage detection in the active damage detection mode when a suspicion of damage has been detected in the passive damage detection mode, by operation of the input device 10 after flight.

When the aircraft has taken off, strains of the structural object 2 composing the aircraft are detected by the strain sensors included as the vibratory sensors 3B in the physical quantity detection unit 3 during flight of the aircraft, in step S1. During the flight of the aircraft, deformations arise in the structural object 2 due to movement of the body. Therefore, strains which include at least deformations of the structural object 2 caused by movement of the body are detected by the strain sensors. The detection signals of the strains detected by the strain sensors are output to the strain detection part 3C. Then, the strain detection part 3C acquires strain amounts of the structural object 2. The acquired strain amounts of the structural object 2 is notified from the strain detection part 3C to the damage detection part 5.

Next, in step S2, the damage detection part 5 determines whether strains have arisen in the structural object 2 with strain amounts large enough to detect damage with sufficient accuracy. As a concrete example, the damage detection part 5 determines whether each strain amount of the structural object 2 obtained in the strain detection part 3C changed temporally with a variation not less than the first threshold value or more than the first threshold value. The first threshold value is determined experientially as the minimum strain amount of the structural object 2 in a case where damage to be detected may exist in the structural object 2.

Note that, the degree of damage to be detected sometimes differs depending on a mission of the aircraft. As a concrete example, when the aircraft is an unmanned non-defensive aircraft, it is desired to detect even minute damage because of focusing on safety. Meanwhile, in a case of a defensive aircraft, small damage due to collision of hailstones or the like may be sometimes ignored although huge damage due to collision of bullets or the like should be detected.

Therefore, the threshold value corresponding to damage to be detected can be determined experientially depending on a mission of the aircraft. In other words, it is appropriate to determine the threshold value for each strain amount of the structural object 2 so that the accuracy of damage detection required for a mission of the aircraft may be secured. Specifically, it is appropriate that the threshold value as a reference for each strain amount of the structural object 2 is set larger when small damage is ignored while the threshold value as a reference for each strain amount of the structural object 2 is set smaller when even small damage should be detected.

When each strain amount of the structural object 2 obtained in the strain detection part 3C has not temporally changed with a variation not less than the first threshold value or more than the first threshold value, it can be determined that damage to be detected has not arisen in the structural object 2. In this case, strain amounts of the structural object 2 are successively monitored by the physical quantity detection unit 3.

When at least one strain amount of the structural object 2 obtained in the rain detection part 3C has temporally changed with a variation not less than the first threshold value or more than the first threshold value, damage may have arisen in the structural object 2. Accordingly, the damage detection part 5 determines whether each strain amount of the structural object 2 obtained in the strain detection part 3C has temporally changed with a variation not less than the second threshold value or more than the second threshold value. The second threshold value is determined experientially as the minimum strain amount of the structural object 2 in a case where it can be determined that a certain degree of damage which should be detected has arisen in the structural object 2.

Therefore, when at least one strain amount of the structural object 2 obtained in the strain detection part 3C has temporally changed with a variation not less than the second threshold value or more than the second threshold value, it can be determined that damage has arisen in the structural object 2. In this case, it can be determined that a strain has arisen in the structural object 2 with a strain amount which allows detecting a certain degree of damage to be detected with sufficient accuracy, i.e., YES, in the judgment of step S2.

Meanwhile, when any strain amount of the structural object 2 obtained in the strain detection part 3C has not temporally changed with a variation not less than the second threshold value or more than the second threshold value although at least one strain amount of the structural object 2 obtained in the strain detection part 3C has temporally changed with a variation not less than the first threshold value or more than the first threshold value, it cannot be determined whether damage has arisen in the structural object 2 or not although damage may have arisen in the structural object 2. In this case, it is determined that no stains have arisen in the structural object 2 with strain amounts which allow detecting damage with sufficient accuracy, i.e., NO, in the judgment of step S2.

When it has been determined No in the judgment of step S2, an instruction for changing the present flight condition of the aircraft to a specific flight condition suitable for damage detection is notified from the damage detection part 5 to the flight condition changing part 4. That is, flight in the damage detection flight mode is instructed from the damage detection part 5 to the flight condition changing part 4.

Then, the flight condition changing part 4 changes the flight condition of the aircraft to the specific flight condition suitable for damage detection, in step S3. Specifically, the flight condition changing part 4 reads one flight condition suitable for damage detection from the storage 6. Then, the flight condition changing part 4 controls the flight control system 7 so that the aircraft flies under the read flight condition. Thereby, the flight mode of the aircraft shifts to the damage detection flight mode. Specifically, the aircraft flies under the previously determined flight conditions, including a load factor, an airspeed, an angular velocity and the like, suitable for damage detection.

Next, in step S4, the physical quantity detection unit 3 detects strain amounts from the structural object 2 of the aircraft flying under the changed flight conditions. The detected strain amounts of the structural object 2 are notified from the physical quantity detection unit 3 to the damage detection part 5.

When the aircraft flies under flight conditions determined so that damage and strain amounts of the structural object 2 caused by the damage expand, for example, the strain amounts of the structural object 2 caused by the damage expand. Therefore, the strain amounts of the structural object 2 detected by the physical quantity detection unit 3 become larger compared with those before changing the flight conditions.

Alternatively, when the aircraft flies under flight conditions determined so that strain amounts of the structural object 2 caused by flight of the aircraft decrease, strain amounts of the structural object 2 caused by damage become larger relatively to the strain amounts of the structural object 2 caused by flight of the aircraft. Therefore, in a case where a plurality of strain sensors are disposed on the structural object 2, it becomes sometimes possible to specify a singular point, at which a strain amount is relatively larger than that at another position, of a two dimers distribution of the strain amounts.

Alternatively, when the aircraft flies under flight conditions under which strain amounts of the structural object 2 caused by flight of the aircraft are known, the strain amounts of the structural object 2 caused by flight of the aircraft become the known strain amounts related with the flight conditions and stored in the storage 6. Therefore, strain amounts consisting of the known strain amounts corresponding to the flight conditions and superimposed strain amounts possibly generated by damage are to be detected in the physical quantity detection unit 3.

When the aircraft flies under the flight conditions under which the strain amounts of the structural object 2 caused by flight of the aircraft are known, the strain amounts of the structural object 2 caused by flight of the aircraft are canceled from the strain amounts detected by the physical quantity detection unit 3 by correction of flight disturbance based on the known strain amounts in step S5. Specifically, the known strain amounts, related to the flight conditions, stored in the storage 6 are subtracted from the strain amounts detected by the physical quantity detection unit 3. That is, ideal strain amounts of the structural object 2 having no damage are subtracted from the measured strain amounts of the structural object 2. Thereby, the strain amounts of the structural object 2 caused by damage can be calculated.

Regardless of whether the aircraft flies under the flight conditions under which the strain amounts of the structural object 2 caused by fight of the aircraft are known, the flight conditions, including a flight load factor, an airspeed and an angular velocity, can be measured with a variety of sensors included in the aircraft. Therefore, the strain amounts of the structural object 2 caused by flight of the aircraft can be obtained based on the measurement result of the flight conditions by the sensors and a database, showing a relation between strain amounts of the structural object 2 and flight conditions, previously obtained by examinations or the like. In this case, the strain amounts of the structural object 2 caused by damage can be also calculated by subtracting the strain amounts of the structural object 2 caused by flight of the aircraft from the strain amounts detected by the physical quantity detection unit 3. Accordingly, the strain amounts of the structural object 2 caused by flight of the aircraft may be obtained not based on control values of the flight conditions but based on measured values of the flight conditions. Note that, a database showing the relation between flight conditions and strain amounts of the structural object 2 can be stored in the storage 6.

The strain amounts of the structural object 2 change depending on the temperature of the structural object 2 since the rigidity of the structural object 2 has temperature dependency. Accordingly, strain amounts corresponding to flight conditions in a case where damage does not exist can be obtained for each temperature beforehand and stored in the storage 6. In that case, the damage detection part 5 can obtain the temperature of the structural object 2 from the temperature sensor 8A included in the structural object 2 so that the strain amounts of the structural object 2 without damage can be obtained based on the temperature of the structural object 2 with higher accuracy. Therefore, the strain amounts of the structural object 2 caused by damage can be obtained with much higher accuracy by subtracting the strain amounts, corresponding to the temperature of the structural object 2 without damage, from the strain amounts detected by the physical quantity detection unit 3.

In addition, the strain amounts of the structural object 2 also change depending on the aerodynamic vibration due to flight of the aircraft. Accordingly, the amplitude of vibration or the like of the structural object 2 due to flight of the aircraft can be obtained from the acceleration sensor 8B installed in the structural object 2 of the aircraft as a time change in acceleration so that the strain amounts of the structural object 2 corresponding to the amount of vibration of the structural object 2 due to flight of the aircraft can be subtracted from the strain amounts detected by the physical quantity detection unit 3. In this case, the strain amounts of the structural object caused by damage can be also obtained.

Thus, known strain amounts of the structural object 2 corresponding to flight conditions, stored in the storage 6, strain amounts corresponding to the temperature of the structural object 2 obtained from the temperature sensor 8A, strain amounts of the structural object 2 corresponding to the acceleration of the structural object 2 obtained from the acceleration sensor 8B, and the like can be used as correction data so that disturbance correction of the strain amounts detected by the physical quantity detection unit 3 can be performed. That is, correction which cancels the strain amounts of the structural object 2 caused by flight of the aircraft can be performed.

When the aircraft flies under flight conditions determined so that the strain amounts of the structural object 2 caused by flight of the aircraft decrease and when the aircraft flies under flight conditions determined so that damage and the strain amounts of the structural object 2 caused by the damage expand, the disturbance correction of the strain amounts may be omitted.

When the necessary disturbance correction has been completed in the damage detection part 5, the strain amounts of the structural object 2 caused by damage are obtained. Alternatively, when the disturbance correction is omitted, the strain amounts in which component parts of the strain amounts of the structural object 2 caused by damage are emphasized are obtained.

Then, the damage detection part 5 determines again whether strains have arisen in the structural object 2 with strain amounts enough to detect damage with sufficient accuracy, in step S6. In this case, threshold processing for comparing with a rough threshold value for determining whether there is possibility that damage has arisen in the structural object 2 and threshold processing for comparing with a strict threshold value for determining whether damage has arisen in the structural object 2 can be also performed, similarly to the judgment in step S2.

When the disturbance correction has been performed, the strain amounts of the structural object 2 caused by damage are subjected to the threshold processing. Conversely, when the disturbance correction has not been performed, the strain amounts of which the component parts of strain amounts of the structural object 2 caused by damage are emphasized are subjected to the threshold processing.

When it is determined that there is possibility of damage but damage is still undetectable, in the judgment of step S6, changing a flight condition, the detection of the strain amounts of the structural object 2 corresponding to the changed flight condition, necessary disturbance correction and the judgment whether damage can be detected, from step S3 are repeated until the damage detection part 5 determines that the set of flight conditions has been changed to all sets of specific flight conditions, in step S7. That is, a feedback control which changes a flight condition sequentially until it is determined that damage is detectable with sufficient accuracy is performed based on a judgment result whether damage is detectable with sufficient accuracy.

When the damage detection part 5 determines that the set of flight conditions has been changed to all sets of specific flight conditions, in step S7, the determination means that damage was not detected with sufficient accuracy. Therefore, the damage detection part 5 determines that damage was not detected with sufficient accuracy, in step S8.

Meanwhile, when it has been determined that damage detection is possible, in the judgment in step S2 or step S6, the damage detection part 5 determines that damage arose in the structural object 2, in step S9. Then, the damage detection part 5 can automatically restrict flight conditions and change a mission by outputting control signals to necessary systems, such as the flight control system 7, in step S10.

As mentioned above, when a strain which may have been caused by damage in the structural object 2 has been detected by the physical quantity detection unit 3 but it cannot be determined exactly whether the strain has been caused by damage, a flight condition of the aircraft can be changed so that whether damage has arisen in the structural object 2 can be determined based on strain amounts detected from the structural object 2 of the aircraft which flies under the changed flight condition. In particular, when flight conditions of the aircraft were changed to flight conditions where strain amounts of the structural object 2 are known, whether damage has arisen in the structural object 2 can be determined based on strain amounts detected from the structural object 2 of the aircraft which flies under the changed specific flight conditions and strain amounts of the structural object 2, related to the changed specific flight condition and corresponding to the state where damage does not exist in the structural object 2, stored in the storage 2.

Next, a case where damage is detected in the active damage detection mode will be described. For example, damage detection in the active damage detection mode can be performed when it is determined in the passive damage detection mode that damage is suspected to have arisen. As a matter of course, damage detection in the active damage detection mode may also be performed regardless of a detection result of damage in the passive damage detection mode.

Figure 3:
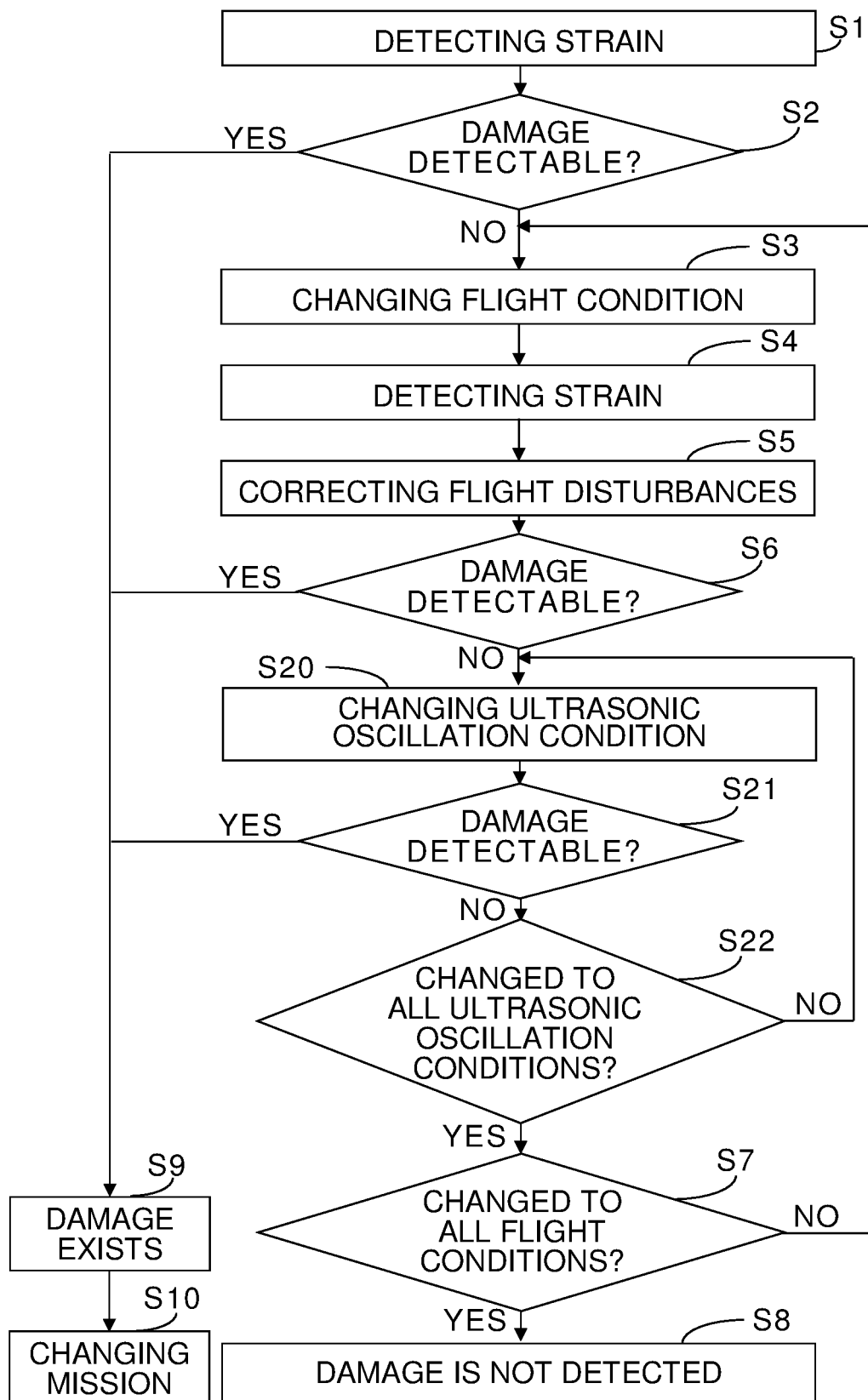
FIG. 3 is a flow chart which shows an example of flow for determining whether damage has arisen in the structural object of an aircraft during flight, in the active damage detection mode, by the damage detection system shown in FIG. 1.

FIG. 3 is a flow chart which shows an example of flow for determining whether damage has arisen in the structural object 2 of an aircraft during flight, in the active damage detection mode, by the damage detection system 1 shown in FIG. 1. In the flow chart shown in FIG. detailed explanation of each step similar to a step in the flow chart shown in FIG. 2 will be omitted with attaching the same sign.

When damage is detected in the active damage detection mode, ultrasonic waves are oscillated from the ultrasonic oscillators 3A towards an inspection area of the structural object 2 for detection of strain amounts of the structural object 2 in step S1 and step S4. Therefore, it is necessary to generate a trigger for oscillating each ultrasonic wave.

The oscillation timing of an ultrasonic wave can be determined freely. For example, an ultrasonic wave can be oscillated by pushing a button by a pilot when the aircraft is a manned aircraft. That is, an ultrasonic wave can be manually oscillated by operation of the input device 10.

Alternatively, strain amounts of the structural object 2 may be detected passively without oscillating ultrasonic waves in step S1 while ultrasonic waves may be oscillated in step S4 using change of a flight condition as a trigger when the flight condition was changed in step S3.

When ultrasonic waves are oscillated in order to detect strain amounts of the structural object 2, the strain amounts of the structural object 2 can be changed by changing at least one oscillation condition of the ultrasonic waves. Accordingly, an oscillation condition of the ultrasonic waves as well as a flight condition can be also changed until it is determined that damage is detectable with sufficient accuracy. That is, a feedback control which changes an oscillation condition of ultrasonic waves until it is determined that damage is detectable in sufficient accuracy can be performed.

Specifically, as shown in FIG. 3, when it is determined that there is possibility that damage has arisen and damage is not detectable with sufficient accuracy after changing a flight condition, an oscillation condition of ultrasonic waves is changed in step S20. Examples of an oscillation condition of ultrasonic waves to be changed include an amplitude and a frequency. For example, increase in amplitude of each ultrasonic wave leads to improvement of detection sensitivity of damage. Further, when a frequency of each ultrasonic wave is increased, distance resolution in damage detection can be improved. From a viewpoint of energy efficiency, it is preferable to set initial values of amplitude and frequency of each ultrasonic wave to an amplitude and a frequency corresponding to small energy and perform an excitation control for gradually increasing the amplitude and the frequency of each ultrasonic wave when damage is not detectable.

When an oscillation condition of ultrasonic waves has been changed, whether strain amounts large enough to detect damage have been detected is determined again by the damage detection part 5, in step S21. Specifically, ultrasonic waves oscillated from the ultrasonic oscillators 3A under the changed oscillation condition propagate in the structural object 2 and are received by the vibratory sensors 3B respectively. Subsequently, ultrasonic wave detection signals which shows the received ultrasonic waveforms are output from the vibratory sensors 3B to the strain detection part 3C.

In the strain detection part 3C, waveforms of ultrasonic waves received by the vibratory sensors 3B are compared to reference waveforms of ultrasonic waves corresponding to the structural object 2 with no strains. Then, strain amounts of the structural object 2 are calculated based on variations of the ultrasonic waveforms received by the vibratory sensors 3B, from the reference waveforms of ultrasonic waves corresponding to the structural object 2 with no strains. Then, each calculated strain amount in the structural object 2 is compared to a threshold value to determine existence of damage. When it is determined that at least one strain amount is not less than the threshold value or more than the threshold value, it can be determined that a strain has arisen in the structural object 2 with a strain amount large enough to detect damage.

Meanwhile, when it is not determined that at least one strain amount of the structural object 2 corresponding to the changed oscillation condition of ultrasonic waves is not less than or more than the threshold to determine existence of damage, it can be determined that any strain has not arisen in the structural object 2 with an strain amount enough to detect damage. Therefore, the judgment of step S21 is No.

When it is determined that strains have not arisen in the structural object 2 with strain amounts large enough to detect damage, the detection of strain amounts and the judgment whether damage detection are possible are repeated with sequentially changing an oscillation condition of ultrasonic waves until it is determined that changes to all selectable preset ultrasonic oscillation conditions are completed, in step S22. When damage still cannot be detected with sufficient accuracy even after ultrasonic oscillation conditions have been changed, a flight condition of the aircraft is changed.

Thus, judgment result whether damage is detectable with sufficient accuracy can be fed back not only to a flight condition of the aircraft but to an oscillation condition of ultrasonic waves.

Next, a flow of the whole information processing and control including control of an aircraft itself including the damage detection system 1 will be described.

Figure 4:
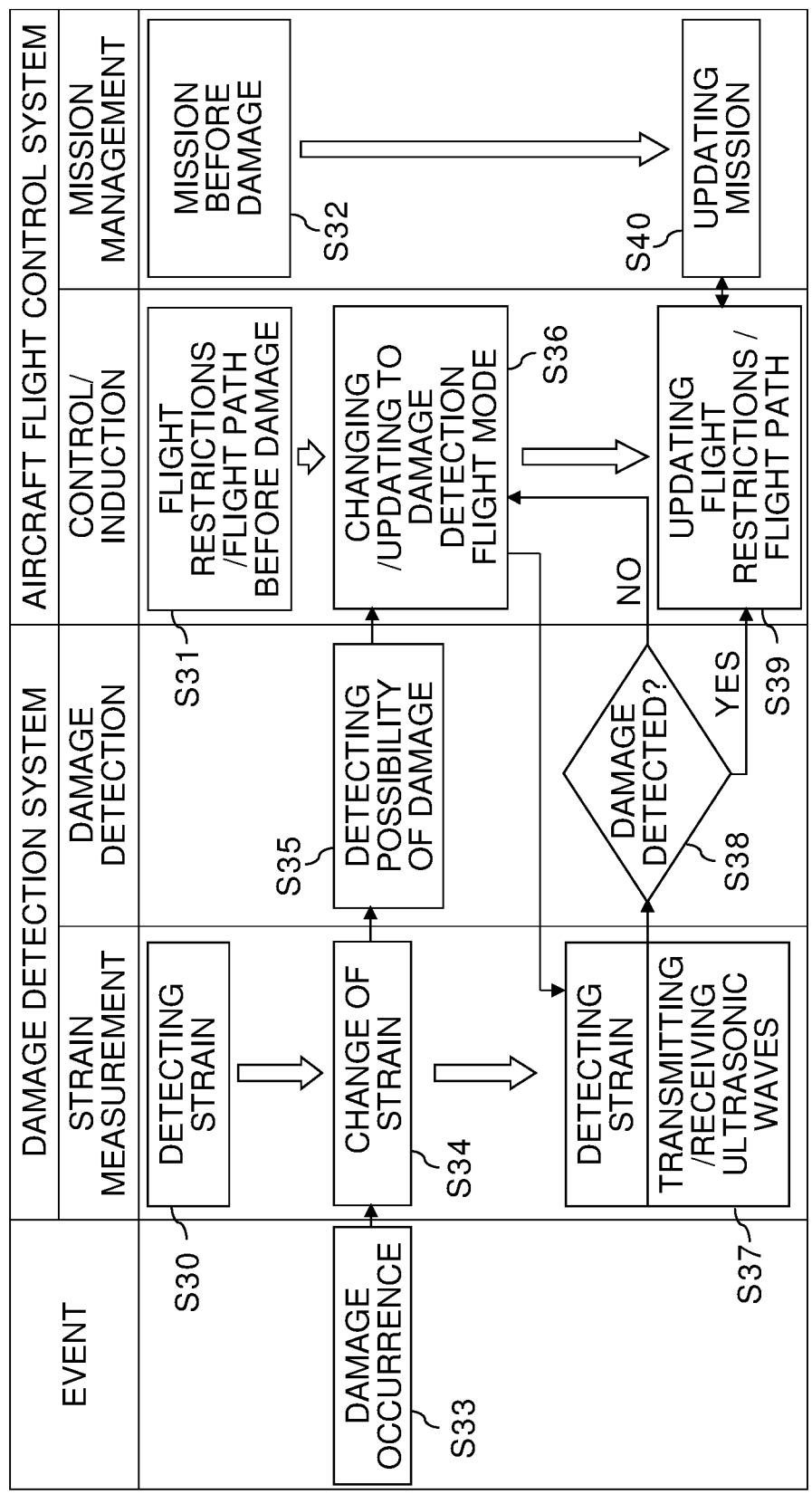
FIG. 4 is a sequence chart which shows an example of flow for updating a mission of an aircraft when damage has been detected in the flow shown in FIG. 2 or FIG.

FIG. 4 is a sequence chart which shows an example of flow for updating a mission of an aircraft when damage has been detected in the flow shown in FIG. 2 or FIG.

When the aircraft flies, strain detection in the structural object 2 is started by the physical quantity detection unit 3 of the damage detection system 1. Then, temporal variations in strain amounts of the structural object 2 are monitored as shown in step S30. For example, the strain amounts of the structural object 2 may be monitored continuously by the strain sensors without oscillating ultrasonic waves in the passive damage detection mode. Alternatively, the strain amounts of the structural object 2 may be obtained periodically by oscillating ultrasonic waves intermittently with a previously designated time interval in the active damage detection mode.

When damage is not detected from the structural object of the aircraft by the damage detection system 1, the aircraft flies along a previously determined flight path under flight restrictions previously determined on the assumption that damage has not arisen, under control by the flight control system 7 of the aircraft, as shown in step S31. Further, the aircraft flies in accordance with missions previously determined on the assumption that damage has not arisen, as shown in step S32.

When the structural object 2 is damaged by an accident, such as collision of a bullet, a thunder or collision of a bird, during flight of the aircraft, as shown in step S33, an oscillatory wave is caused by the shock and strain amounts of the structural object 2 changes as shown in step S34. Then, the damage detection part 5 can detect at least possibility of damage in step S35. Specifically, threshold processing is performed with a threshold value less than a threshold value to each strain amount of the structural object 2 for detecting damage, thereby possibility of damage can be detected although damage cannot be detected certainly.

When possibility of damage has been detected by the damage detection part 5, a flight mode of the aircraft is changed from a normal flight mode to the damage detection flight mode, in step S36. Specifically, the flight condition changing part 4 reads a specific flight condition suitable for detecting damage from the storage 6, and notifies the specific flight condition to the flight control system 7. Then, the flight control system 7 controls the flight condition of the aircraft so that the flight condition is changed to the specific flight condition notified from the flight condition changing part 4. Thereby, the aircraft can be made to fly in the damage detection flight mode.

During the flight in the damage detection flight mode, the strain amounts of the structural object 2 are detected in the passive damage detection mode or the active damage detection mode as shown in step S37. The detected strain amounts of the structural object 2 are given to the damage detection part 5. Then, the damage detection part 5 detects existence of damage based on the strain amounts of the structural object 2 detected during the flight in the damage detection flight mode, in step S38.

When existence of damage cannot be detected with sufficient accuracy in step S38, the flight mode of the aircraft is updated to another damage detection flight mode in which the aircraft flies under other flight conditions, in step S36. That is, the flight condition changing part 4 reads another specific flight condition suitable for detecting damage from the storage 6, and notifies the specific flight condition to the flight control system 7. Then, the flight control system 7 controls the flight condition of the aircraft so that the flight condition is changed to the other specific flight condition notified from the flight condition changing part 4. Thereby, the aircraft can be made to fly in the updated damage detection flight mode.

Such update of the damage detection flight mode in step S36 is repeated until existence of damage can be detected with sufficient accuracy by the damage detection part 5 in step S38. When the damage detection part 5 detects damage in the structural object 2 in step S38, the damage detection part 5 detects the size, a position, an area and the like of the damage arisen in the structural object 2, as necessary, and notifies them to the flight control system 7.

Then, the flight control system 7 updates flight restriction and a flight path of the aircraft based on detection information, such as the size, a position, an area and the like, of the damage arisen in the structural object 2, in step S39. That is, flight restrictions and a flight path with which the structural object 2 having strength deteriorated due to the damage can bear load are applied. Meanwhile, a mission of the aircraft is also updated in accordance with the updated flight restrictions and the updated flight path, in step S40. When the mission has been updated, the flight restrictions and the flight path are further updated in accordance with the updated mission, as necessary.

(Effects)

As described above, the damage detection system 1 and the damage detecting method can improve detection accuracy of damage arisen in the structural object 2 of the aircraft, during flight of the aircraft by making the aircraft fly in a flight state suitable for detecting damage.

Therefore, according to the damage detection system 1 and the damage detecting method, damage in the structural object 2 can be detected with high accuracy using the conventional sensors even during flight of an aircraft. In particular, safety can be improved when the aircraft is an unmanned aircraft.

(Second Implementation)

Figure 5:
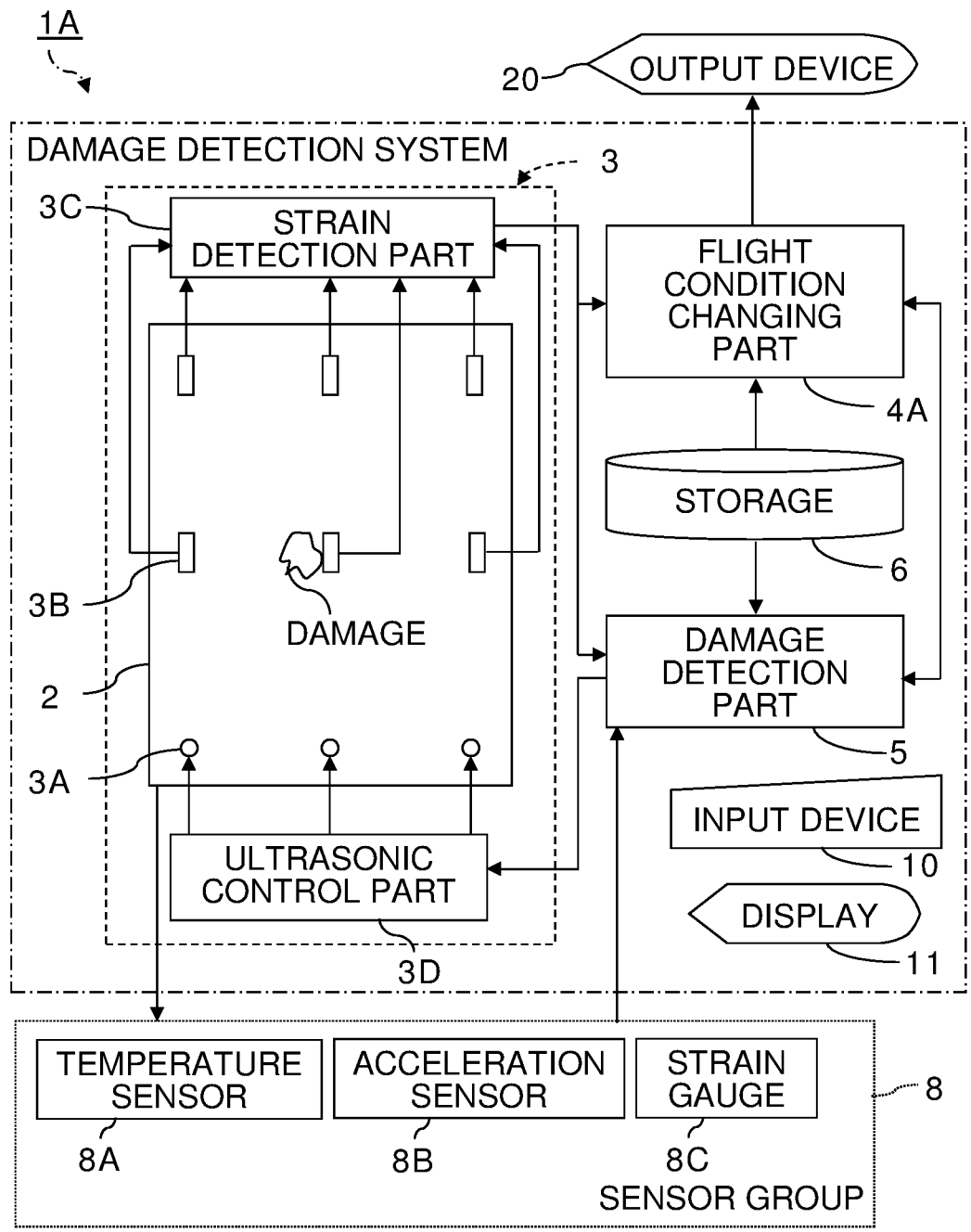
FIG. 5 is a configuration diagram of a damage detection system according to the second implementation of the present invention.

FIG. 5 is a configuration diagram of a damage detection system according to the second implementation of the present invention.

The damage detection system 1A in the second implementation shown in FIG. 5 is different from the damage detection system 1 in the first implementation in functions of the flight condition changing part 4A. Since other configurations and actions of the damage detection system 1A in the second implementation are not substantially different from those of the damage detection system 1 in the first implementation, explanation for the same or corresponding element will be omitted with attaching the same sign.

The flight condition changing part 4A of the damage detection system 1A in the second implementation is configured to notify change to a specific flight condition, suitable for detecting damage which may arise in the structural object 2, to a pilot of an aircraft so that the pilot can manually change a flight condition of the aircraft. The change to a specific flight condition can be notified by a desired method, such as a display of a message, voice, a light, or sound.

Therefore, the flight condition changing part 4A is connected to an output devices 20, such as a display, a speaker or a lamp, corresponding to a method of notifying change to a specific flight condition. Then, the flight condition changing part 4A is configured to output necessary information to the output device 20 so that changing a flight condition can be instructed to a pilot of the aircraft. When change to a specific flight condition is notified by displaying a message, the message may be displayed on the display 11.

According to the above-mentioned damage detection system 1A in the second implementation, effect similar to that by the damage detection system 1 in the first implementation can be obtained. In particular, the damage detection system 1A in the second implementation can determine whether damage has arisen in the structural object 2 without automatic control of complicated flight conditions for a manned aircraft.

(Third Implementation)

Figure 6:
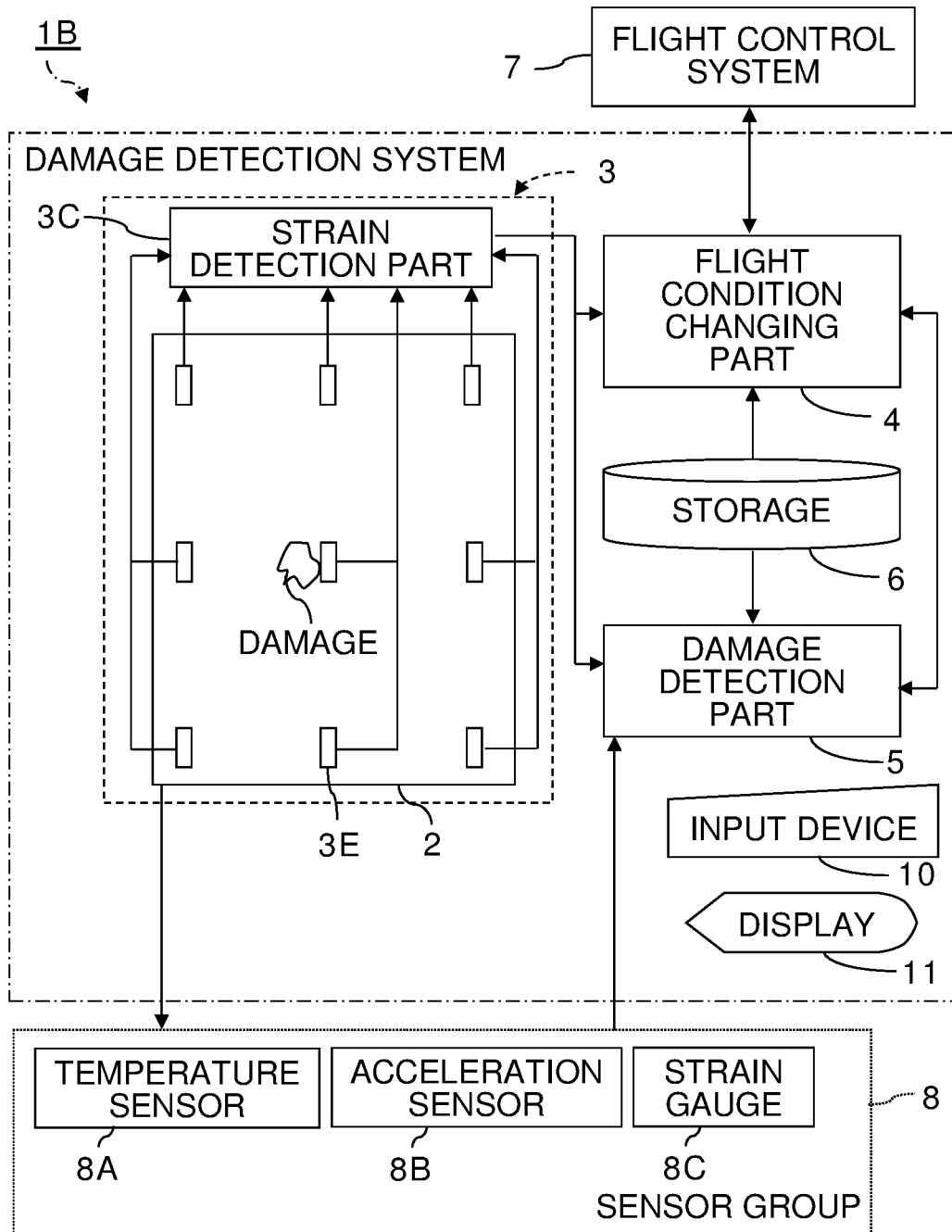
FIG. 6 a configuration diagram of a damage detection system according to the third implementation of the present invention.

FIG. 6 is a configuration diagram of a damage detection system according to the third implementation of the present invention.

The damage detection system 1B in the third implementation shown in FIG. 6 is different from the damage detection system 1 in the first implementation in configuration of the physical quantity detection unit 3. Since other configurations and actions of the damage detection system 1B in third implementation are not substantially different from those of the damage detection system 1 in the first implementation, explanation for the same or corresponding element will be omitted with attaching the same sign.

The physical quantity detection unit 3 of the damage detection system 1B in the third implementation is composed of strain sensors 3E, for detecting strains which have arisen in the structural object 2, and the strain detection part 3C, which detects strain amounts of the structural object 2 based on detection signals from the strain sensors 3E. Similarly to the first implementation, disposing the strain sensors 3E on the structural object 2 at appropriate intervals makes it possible to widen the detection range of damage. For each strain sensor 3E, an optical fiber sensor or the like can be used.

That is, the damage detection system 1B in the third implementation is configured to perform only damage detection in the passive damage detection mode while the damage detection system 1 in the first implementation is configured to perform damage detection in the passive damage detection mode and damage detection in the active damage detection mode by switching operation of the ultrasonic oscillators 3A.

According to the damage detection system 1B in the third implementation having such configuration, amounts of strains which have arisen in the structural object 2 can be detected without oscillating ultrasonic waves. Accordingly, the configuration and control of the physical quantity detection unit 3 can be simplified. As a matter of course, a pilot of the aircraft may manually change a flight condition of the aircraft to a specific flight condition suitable for detecting damage in the third implementation, like the second implementation.

Further, other physical quantity sensors, such as acceleration sensors, may be used instead of the strain sensors 3E so that damage can be detected in the passive damage detection mode in the third implementation.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A damage detection system comprising:
a storage that stores:
instructions for flying an aircraft in an active damage detection flight mode that causes physical changes to the aircraft to facilitate detection of suspected damage, and
a plurality of reference physical quantities associated with the active damage detection flight mode and a structural object of the aircraft,
wherein the plurality of reference physical quantities include at least one of a strain, a vibration, or an acceleration of the structural object that is expected when the aircraft is in flight, in the active damage detection flight mode, without damage to the structural object;
a physical quantity detection unit, including at least one sensor, configured to detect a value of a first physical quantity of the structural object during a flight of the aircraft in a passive damage detection mode in which the physical quantity detection unit is operating during normal flight operations;
a flight condition changing circuit configured to change the flight of the aircraft to the active damage detection mode, to determine whether a damage arose in the structural object, when the value of the first physical quantity detected by the physical quantity detection unit indicates that the damage may have occurred in the structural object;
a damage detection circuit configured to determine whether the damage arose in the structural object, based on an additional value of the first physical quantity or a value of a second physical quantity of the structural object detected by the physical quantity detection unit while the aircraft is flying in the active damage detection flight mode; and
wherein the damage detection circuit is adapted to determine whether the damage arose in the structural object, based on a comparison of the additional value of the first physical quantity or the value of the second physical quantity with a corresponding one of the plurality of reference physical quantities for the active damage detection flight mode without damage to the structural object.

2. The damage detection system according to claim 1, wherein the flight condition changing circuit is adapted to instruct a pilot of the aircraft to change the flight of the aircraft to the active damage detection mode manually by the pilot.

3. The damage detection system according to claim 1, wherein the flight condition changing circuit is adapted to automatically change the flight of the aircraft to the active damage detection mode, by controlling a flight control system of the aircraft.

4. The damage detection system according to claim 1, wherein the physical quantity detection unit includes:
an ultrasonic oscillator that makes the structural object propagate at least one ultrasonic wave;
an ultrasonic sensor that receives the at least one ultrasonic wave propagated by the structural object; and
a strain detection circuit that detects at least one strain quantity of the structural object based on a change of a waveform of the at least one ultrasonic wave, received by the ultrasonic sensor, from a reference waveform.

5. The damage detection system according to claim 1, wherein the physical quantity detection unit includes:
a strain sensor that detects a strain which arose in the structural object; and
a strain detection circuit that detects a strain quantity of the structural object based on a detection signal from the strain sensor.

6. The damage detection system according to claim 1, wherein the active damage detection mode corresponds to a specific flight condition for at least one of a load factor, an airspeed, and an angular velocity of the aircraft.

7. The damage detection system according to claim 1, wherein the additional value of the first physical quantity or the value of the second physical quantity include at least one of a temperature acquired from a temperature sensor installed to the aircraft, an acceleration acquired from an acceleration sensor installed to the aircraft, and a strain quantity acquired from a strain gauge installed to the aircraft.

8. A damage detection system comprising:
a physical quantity detection unit configured to detect a value of a first physical quantity of a structural object composing an aircraft during a flight of the aircraft in a passive damage detection mode in which the physical quantity detection unit is active during normal flight operations;
a flight condition changing circuit configured to change the flight of the aircraft to an active damage detection mode that causes physical changes to the aircraft that facilitate a determination of whether a damage arose in the structural object, when the value of the first physical quantity detected by the physical quantity detection unit indicates that the damage may have occurred in the structural object; and
a damage detection circuit configured to determine whether the damage arose in the structural object, based on an additional value of the first physical quantity or a value of a second physical quantity of the structural object detected by the physical quantity detection unit while the aircraft is flying in the active damage detection mode;
wherein the physical quantity detection unit includes:
an ultrasonic oscillator that makes the structural object propagate at least one ultrasonic wave;
an ultrasonic sensor that receives the at least one ultrasonic wave propagated by the structural object;
a strain detection circuit that detects at least one strain quantity of the structural object based on a change of a waveform of the at least one ultrasonic wave, received by the ultrasonic sensor, from a reference waveform; and
an ultrasonic control circuit that changes at least one of a frequency and an amplitude of the at least one ultrasonic wave oscillated from the ultrasonic oscillator during the flight of the aircraft in the active damage detection mode,
wherein the additional value of the first physical quantity or the value of the second physical quantity is a strain quantity detected based on changes of waveforms of ultrasonic waves from reference waveforms, the ultrasonic waves being each oscillated from the ultrasonic oscillator with changing at least one of the frequency and the amplitude, the ultrasonic waves being each propagated by the structural object.

9. The damage detection system according to claim 8, wherein the flight condition changing circuit is adapted to instruct a pilot of the aircraft to change the flight of the aircraft to the active damage detection mode manually by the pilot.

10. The damage detection system according to claim 8, wherein the flight condition changing circuit is adapted to automatically change the flight of the aircraft to the active damage detection mode, by controlling a flight control system of the aircraft.

11. The damage detection system according to claim 8, wherein the active damage detection mode of the aircraft is a flight mode with a specific value of at least one of a load factor, an airspeed, and an angular velocity of the aircraft.

12. A damage detection system comprising:
a physical quantity detection unit, including at least one sensor, configured to detect a value of a first physical quantity of a structural object composing an aircraft during a flight of the aircraft in a passive damage detection mode in which the physical quantity detection unit is active during normal flight operations;
a flight condition changing circuit configured to change the flight of the aircraft to an active damage detection flight mode that causes physical changes to the aircraft that facilitate a determination of whether a damage arose in the structural object, when the value of the first physical quantity of the structural object indicates that the damage may have occurred; and
a damage detection circuit configured to determine whether the damage arose in the structural object, based on an additional value of the first physical quantity or a value of a second physical quantity of the structural object detected by the physical quantity detection unit while the aircraft is flying in the active damage detection flight mode,
wherein the flight condition changing circuit is further adapted to change the flight of the aircraft to another active damage detection flight mode when whether the damage arose in the structural object cannot be determined by the damage detection circuit based on the additional value of the first physical quantity or the value of the second physical quantity detected while the aircraft was flying in the active damage detection mode.

13. The damage detection system according to claim 12, wherein the flight condition changing circuit is adapted to instruct a pilot of the aircraft to change the flight of the aircraft to the active damage detection flight mode manually by the pilot.

14. The damage detection system according to claim 12, wherein the flight condition changing circuit is adapted to automatically change flight of the aircraft to the active damage detection flight mode, by controlling a flight control system of the aircraft.

15. The damage detection system according to claim 12, wherein the physical quantity detection unit includes:
an ultrasonic oscillator that makes the structural object propagate at least one ultrasonic wave;
an ultrasonic sensor that receives the at least one ultrasonic wave propagated by the structural object; and
a strain detection circuit that detects at least one strain quantity of the structural object based on a change of a waveform of the at least one ultrasonic wave, received by the ultrasonic sensor, from a reference waveform.

16. The damage detection system according to claim 12, wherein the physical quantity detection unit includes:
a strain sensor that detects a strain which arose in the structural object; and
a strain detection circuit that detects a strain quantity of the structural object based on a detection signal from the strain sensor.

17. A damage detection method comprising:
storing at least one reference physical quantity of a structural object of an aircraft, the at least one reference physical quantity related to an active damage detection flight mode of the aircraft, wherein flying the aircraft in the active damage detection flight mode causes physical changes to the aircraft that facilitate a determination of whether damage to the aircraft has occurred, and wherein the at least one reference physical quantity includes at least one of a strain, a vibration, or an acceleration of the structural object expected when the aircraft is in flight, in the active damage detection flight mode without damage to the structural object;
detecting a value of a first physical quantity of the structural object during a flight of the aircraft in a passive damage detection flight mode in which the first physical quantity is monitored during normal flight operations;
determining, based on the value of the first physical quantity, that a damage may have arose in the structural object during the flight of the aircraft in the passive damage detection flight mode;
changing the flight of the aircraft to the active damage detection flight mode, when the value of the first physical quantity of the structural object has been detected; and
determining whether the damage arose in the structural object, based on an additional value of the first physical quantity or a second physical quantity detected while the aircraft is flying in the active damage detection mode,
wherein whether the damage arose in the structural object is determined based on a comparison of the additional value of the first physical quantity or the second physical quantity and the at least one reference physical quantity.

18. The damage detection method according to claim 17, wherein the active damage detection mode is determined to reduce a strain quantity of the structural object arising due to flying of the aircraft.

19. A damage detection method comprising:
detecting a value of a first physical quantity of a structural object composing an aircraft during a flight of the aircraft in a passive damage detection flight mode in which the first physical quantity is monitored during normal flight operations;
determining, based on the value of the first physical quantity, that a damage may have arose in the structural object during the flight of the aircraft in the passive damage detection flight mode;
changing the flight of the aircraft to an active damage detection flight mode that causes physical changes to the aircraft that help determine whether the damage arose, when the value of the first physical quantity of the structural object has been detected; and
determining whether the damage arose in the structural object, based on an additional value of the first physical quantity or a value of a second physical quantity of the structural object of the aircraft while the aircraft is flying in the active damage detection flight mode,
wherein the active damage detection flight mode of the aircraft is configured to cause an expansion of the damage which may have rose in the structural object, if the damage did arise.

20. A damage detection method comprising:
detecting a value of a first physical quantity of a structural object composing an aircraft during a flight of the aircraft in a passive damage detection flight mode in which the first physical quantity is monitored during normal flight operations;
determining, based on the value of the first physical quantity, that a damage may have arose in the structural object during the flight of the aircraft in the passive damage detection flight mode;
changing the flight of the aircraft to an active damage detection flight mode that causes physical changes to the aircraft that help determine whether the damage arose, when the value of the first physical quantity of the structural object has been detected; and
determining whether the damage arose in the structural object, based on a strain quantity of the structural object of the aircraft while the aircraft is flying in the active damage detection flight mode,
wherein the active damage detection flight mode is a flight mode that increases the strain quantity of the structural object arising due to the damage which may have arose in the structural object, and
whether the damage arose in the structural object is determined based on a detection result of the increased strain quantity.

* * * * *